United States Patent [19]

Higashi

[11] Patent Number: 4,605,998

[45] Date of Patent: Aug. 12, 1986

[54] SWITCHING CONTROL CIRCUIT

[75] Inventor: Shinya Higashi, Tokyo, Japan

[73] Assignee: Kabushiki Kaisha Toshiba, Kawasaki, Japan

[21] Appl. No.: 599,580

[22] Filed: Apr. 12, 1984

[30] Foreign Application Priority Data

Apr. 14, 1983 [JP] Japan .............................. 58-55742[U]

[51] Int. Cl.$^4$ ........................................... H02M 3/335
[52] U.S. Cl. ....................................... 363/19; 363/97; 323/289; 307/289; 307/315
[58] Field of Search ............................. 363/18, 19, 97; 323/289; 307/280, 300, 289, 313, 315

[56] References Cited

U.S. PATENT DOCUMENTS 4,488,210  12/1984  Shono .................................... 363/19

OTHER PUBLICATIONS

"Flyback Converters: Solid-State Solution to Low-Cost Switching Power Supplies", Boschert, Robert J., *Electronics* Dec. 21, 1978, pp. 100-104.

*Primary Examiner*—Patrick R. Salce
*Attorney, Agent, or Firm*—Cushman, Darby & Cushman

[57] ABSTRACT

A switching control circuit has a switching control transistor between a base current path of a switching power transistor and an emitter current limiting resistor. A collector current flows through the switching control transistor in the same direction as that of an emitter current flowing through the emitter current limiting resistor when the switching power transistor is held in an ON state. The direction of a current flowing through the emitter current limiting resistor does not change even if the switching control transistor is turned on so as to turn off the switching power transistor.

1 Claim, 14 Drawing Figures

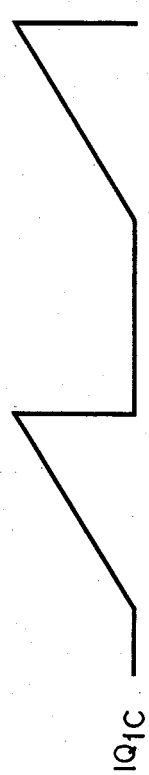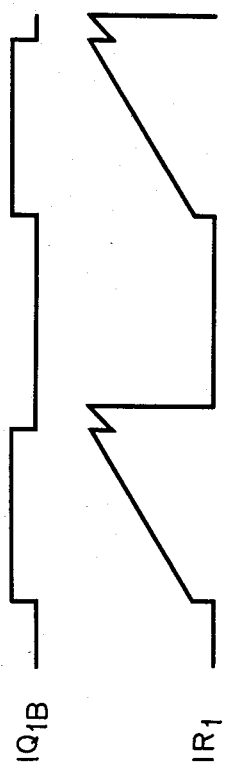
FIG. 2A (PRIOR ART) $IQ_{1C}$
FIG. 2B (PRIOR ART) $IR_2$
FIG. 2C (PRIOR ART) $IQ_{2C}$
FIG. 2D (PRIOR ART) $IQ_{1B}$
FIG. 2E (PRIOR ART) $IR_1$

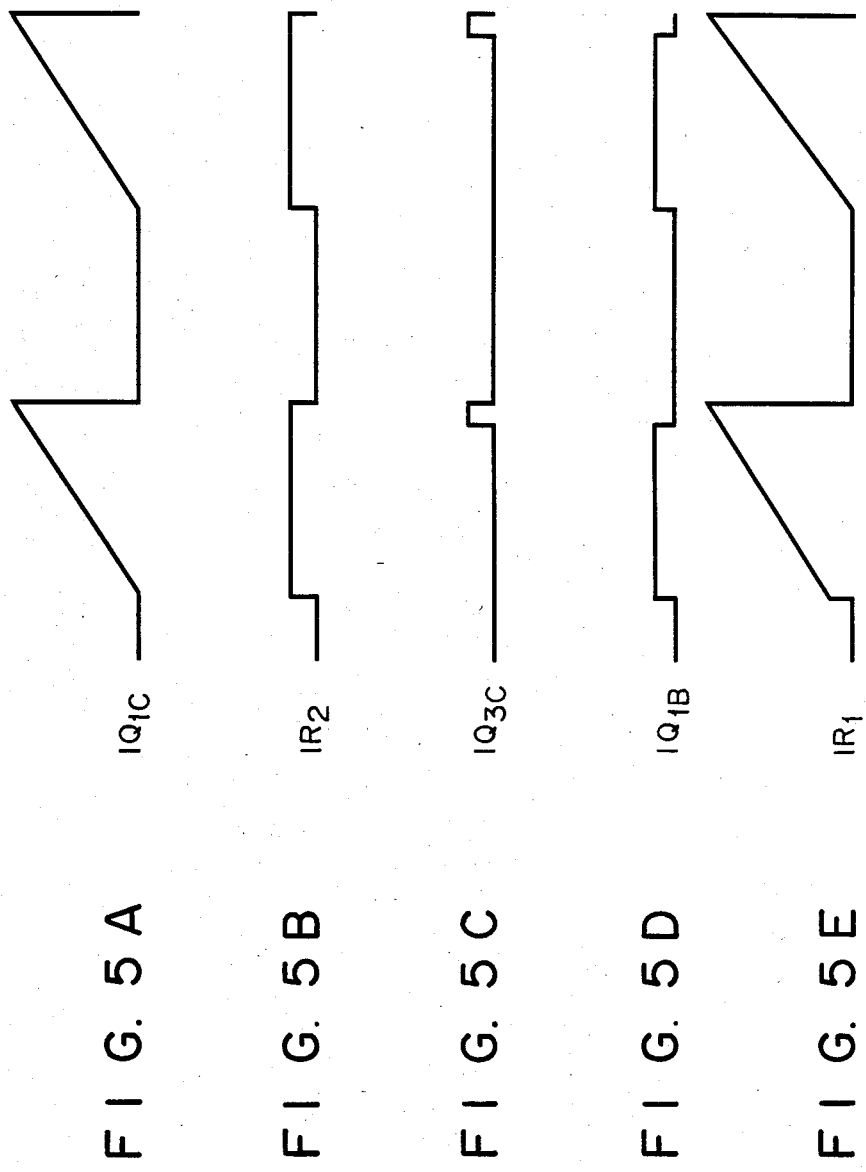

SWITCHING CONTROL CIRCUIT

BACKGROUND OF THE INVENTION

The present invention relates to a switching control circuit for use in a switching regulator of the self-excited ringing choke converter type.

A conventional switching regulator of the self-excited ringing choke converter type shown in FIG. 1 comprises a voltage transformer (for flyback choke) T1, a switching power transistor Q1, a switching control transistor Q2 for controlling on/off operation of the transistor Q1, a limiting resistor R1 for limiting the emitter current of the transistor Q1, a limiting resistor R2 for limiting the base current of the transistor Q1, a limiting resistor R3 for limiting the base current of the transistor Q2, a triggering resistor R4 for turning on the transistor Q1 when the regulator is powered, diodes CR1 and CR2, a capacitor C1 for turning on the transistor Q1 in the next cycle, and a smoothing capacitor C2.

When an astable DC power supply voltage (i.e., input voltage VIN) is applied to the switching regulator, the switching power transistor Q1 is turned on by means of the triggering resistor R4. The resistor R4 serves to turn on the transistor Q1 when the switching regulator is powered, so that the resistor R4 has a resistance of as high as several tens of kilohms to several hundreds of kilohms. When the transistor Q1 is turned on, a voltage substantially corresponding to the input voltage VIN is applied across a primary winding N1 of the voltage transformer T1. A voltage is induced in a base winding NB in proportion to the turn ratio of a base winding NB of the transformer T1 to the primary winding N1 thereof. The induced voltage causes a base current to flow through the base of the transistor Q1 through the diode CR1 and the resistor R2, so that the transistor Q1 is held in a stable ON state. In this case, the voltage polarities of the respective windings of the transformer T1 are given as shown in FIG. 3A. A collector current (primary current of the transformer T1) of the transistor Q1 increases linearly. In this case, a voltage induced in a secondary winding N2 of the transformer T1 is blocked by the output diode CR2, so that no current flows through a load L. When the collector current of the transistor Q1 increases in the manner described above and a ratio of the collector current to the base current of the transistor Q1 exceeds a current amplification or current transfer ratio h$_{fe}$, a current flowing through the resistor R4 increases, so that a voltage drop across the resistor R4 is increased. The transistor Q1 is thus no longer saturated. A collector-emitter voltage VCE of the transistor Q1 abruptly increases. When this voltage increases, a voltage across the primary winding N1 of the transformer T1 decreases. Therefore, a voltage across the base winding NB decreases and the transistor Q1 is turned off.

When the transistor Q1 is turned off, energy which has been charged by the primary winding N1 of the transformer T1 is transferred to the secondary winding N2 and is discharged through the diode CR2. A current flowing through the diode CR2 is smoothed by the smoothing capacitor C2 and is transferred to the load L, thereby obtaining an output voltage VOUT. A current flowing through the diode CR2 has a peak value when the transistor Q1 is held OFF. As the transistor Q1 becomes gradually saturated, the current flowing through the diode CR2 decreases linearly. The peak value is given as (N2/N1)×(maximum collector current immediately before the transistor Q1 is turned off), where N2/N1 is given in acccordance with the turn ratio of N1 (primary winding): N2 (secondary winding). The voltage polarities of the respective windings of the transformer T1 in the OFF state of the transistor Q1 are illustrated in FIG. 3B and are opposite to those shown in FIG. 3A. During the OFF state of the transistor Q1, the capacitor C1 is charged with the input voltage VIN through the resistor R4.

During the OFF state of the transistor Q1, a negative voltage is induced by the base winding NB of the transformer T1, as shown in FIG. 3B. This voltage is given as (V0+VFD0)×(NB/N2), where V0 is the output voltage, VFD0 is the forward bias voltage of the output diode CR2, and NB/N2 is the turn ratio of the base winding NB to the secondary winding N2. As described above, the capacitor C1 is charged during the OFF state of the transistor Q1. When the charge current exceeds a sum of the voltage at the base winding NB of the transformer T1 and a base-emitter voltage VBE of the transistor Q1, the transistor Q1 is turned on. In the normal state, the transistor Q1 will not be turned on until energy at the secondary winding N2 of the transformer T1 is completely discharged. When the energy discharge is completed and the diode CR2 is turned off, no voltage is applied to the base winding NB of the transformer T1. In this case, when the charge current of the capacitor C1 exceeds the sum of the voltage (0 V) at the base winding NB and the voltage VBE of the transistor Q1, the transistor Q1 is turned on. As a result, a voltage substantially equal to the input voltage VIN is applied across the primary winding N1 of the transformer T1, as described above. A positive voltage is induced in the base winding NB in proportion to the turn ratio of the base winding NB to the primary winding N1 (see FIG. 3A). The induced voltage in the base winding NB causes the base current to flow through the transistor Q1 through the diode CR1 and the resistor R2. Therefore, the transistor Q1 is held in the stable conduction state. In this manner, the transistor Q1 is alternately turned on/off to generate a triangular wave current which is then smoothed by the capacitor C2, thereby obtaining the output voltage VOUT.

The transistor Q2 is arranged to stabilize the output voltage VOUT against variations in the input voltage VIN and load L. As shown in FIG. 1, and as is described in "Electronics/Dec. 21, 1978 pp. 100–104, "Flyback converters: solid-state solution to low-cost switching power supplies" by Robert J. Boschert", the transistor Q2 (also shown as transistor Q2 in FIG. 3 in this reference) is fed back with the output voltage. The base-emitter voltage of the transistor Q2 is controlled in accordance with the output voltage VOUT to change the OFF timing of the transistor Q1 so as to flow the base current of the transistor Q1 as the collector current of the transistor Q2. Therefore, the energy charge by the primary winding N1 of the transformer T1 is controlled, and hence the output voltage VOUT can be stabilized.

However, according to this conventional switching regulator, when the base current IQ1B of the transistor Q1 is withdrawn while the transistor Q2 is turned on to turn off the transistor Q1, a current IR1 flowing through the emitter current limiting resistor R1 is decreased by the base current component, as shown in FIG. 2E. Thus, in the conventional switching regulator, the ON state of the transistor Q2 becomes unstable, the storage time of the transistor Q1 increases, and a large power loss occurs. As a result, highly precise voltage control cannot be expected.

SUMMARY OF THE INVENTION

It is an object of the present invention to provide a switching control circuit for a switching regulator of the self-excited ringing choke converter type, wherein a power loss can be greatly decreased and highly precise voltage control can be stably performed.

BRIEF DESCRIPTION OF THE DRAWINGS

Other objects and features of the present invention will be apparent from the following description taken in connection with the accompanying drawings, in which:

FIGS. 2A through 2E are respectively timing charts of signals generated in the main part of the circuit shown in FIG. 1, in which FIG. 2A shows a collector current IQ1C of a transistor Q1, FIG. 2B shows a current IR2 flowing through a resistor R2, FIG. 2C shows a collector current IQ2C of a transistor Q2, FIG. 2D shows a base current IQ1B of the transistor Q1, and FIG. 2E shows a current IR1 flowing through a resistor R1;

FIGS. 5A to 5E are respectively timing charts of signals generated from the main part of the circuit shown in FIG. 4, in which FIG. 5A shows a collector current IQ1C of a transistor Q1, FIG. 5B shows a current IR2 flowing through a resistor R2, FIG. 5C shows a collector current IQ3C of a transistor Q3, FIG. 5D shows a base current IQ1B of the transistor Q1, and FIG. 5E shows a current IR1 flowing through a resistor R1.

DETAILED DESCRIPTION OF THE PREFERRED EMBODIMENT

Figure 4:
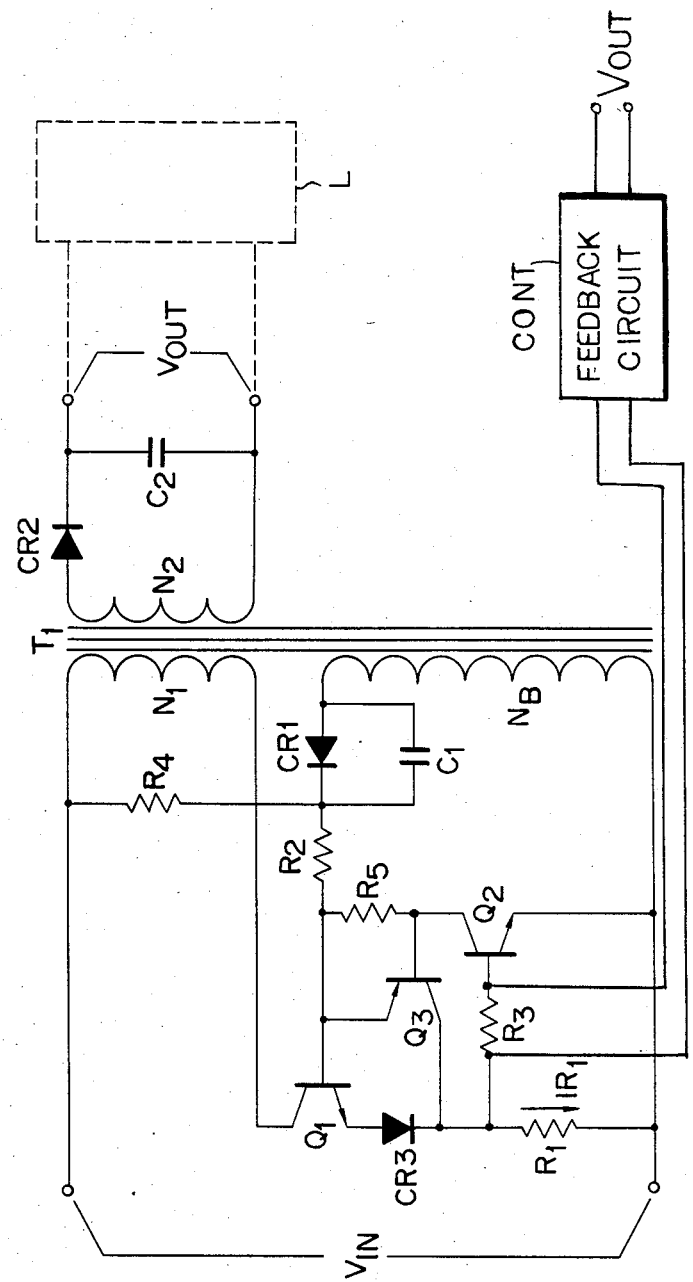
FIG. 4 is a circuit diagram showing a switching control circuit according to an embodiment of the present invention.

FIG. 4 shows a switching control circuit for a switching regulator of the self-excited ringing choke converter type according to an embodiment of the present invention.

A voltage transformer T1 comprises a flyback transformer. Excited energy generated by the primary winding is held. When the primary winding is deenergized or cut off, the excited energy is discharged to the secondary winding. The transformer T1 has a primary winding N1, a secondary winding N2 and a base winding NB. A switching power transistor Q1 switches a current flowing through the primary winding N1. The collector of the transistor Q1 is connected to one end of the primary winding N1 of the transformer T1, and an emitter thereof is connected to one end of the base winding NB through a diode CR3 and an emitter current limiting resistor R1. An input voltage VIN is applied between the other end of the primary winding N1 and the connecting node between the base winding NB and the emitter side of the transistor Q1. The base of the transistor Q1 is connected to the other end of the base winding NB through a base current limiting resistor R2 and a parallel circuit of a diode CR1 and a capacitor C1. The capacitor C1 supplies energy to turn on the transistor Q1 in the next cycle after the transistor Q1 is turned off. A triggering resistor R4 is connected between the common node between the resistor R2 and the parallel circuit of the diode CR1 and the capacitor C1, and the end of the primary winding N1 which receives the input voltage VIN. The triggering resistor R4 serves to trigger the transistor Q1. The base of the transistor Q1 is also connected to the emitter of a transistor Q3. The collector of the transistor Q3 is connected to the common node between the diode CR3 and the resistor R1. The base of the transistor Q3 is connected to the base of the transistor Q1 through a resistor R5. The transistor Q2 controls the cut-off operation of the transistor Q1. The collector of the transistor Q2 is connected to the base of the transistor Q3, and the emitter of the transistor Q2 is connected to the end of the base winding NB which receives the input voltage VIN. The base of the transistor Q2 is connected through the base current limiting resistor R3 to a common line connected to the collector of the transistor Q3, the diode CR3 and the resistor R1. The resistance of the resistor R5 is preset such that the transistor Q3 is turned on by a voltage drop caused by a collector current of the transistor Q2 which flows through the resistor R5. The secondary winding N2 of the transformer T1 is connected to the output terminal through a diode CR2 which is connected in series therewith, and a smoothing capacitor C2 which is connected in parallel therewith. A load L is connected to the output terminal.

In the switching control circuit arranged in the manner described above, the transistor Q2 is turned on so as to turn off the transistor Q1. In this case, the base current IQ1B of the transistor Q1 is used as the collector current of the transistor Q2. At the same time, the transistor Q3 is turned on due to a voltage drop across the resistor R5. The base current IQ1B which has triggered the transistor Q1 flows in the resistor R1 through the emitter-collector path of the transistor Q3. For this reason, the direction of a current IR1 flowing through the resistor R1 at the ON time of the transistor Q3 (i.e., withdrawal of the base current IQ1B of the transistor Q1) is the same as that during the previous ON time of the transistor Q1, as shown in FIG. 5E. Therefore, the change in direction of the current IR1 shown in FIG. 2E does not occur in this case. Therefore, the transistors Q2 and Q3 are stably turned on.

Figure 1:
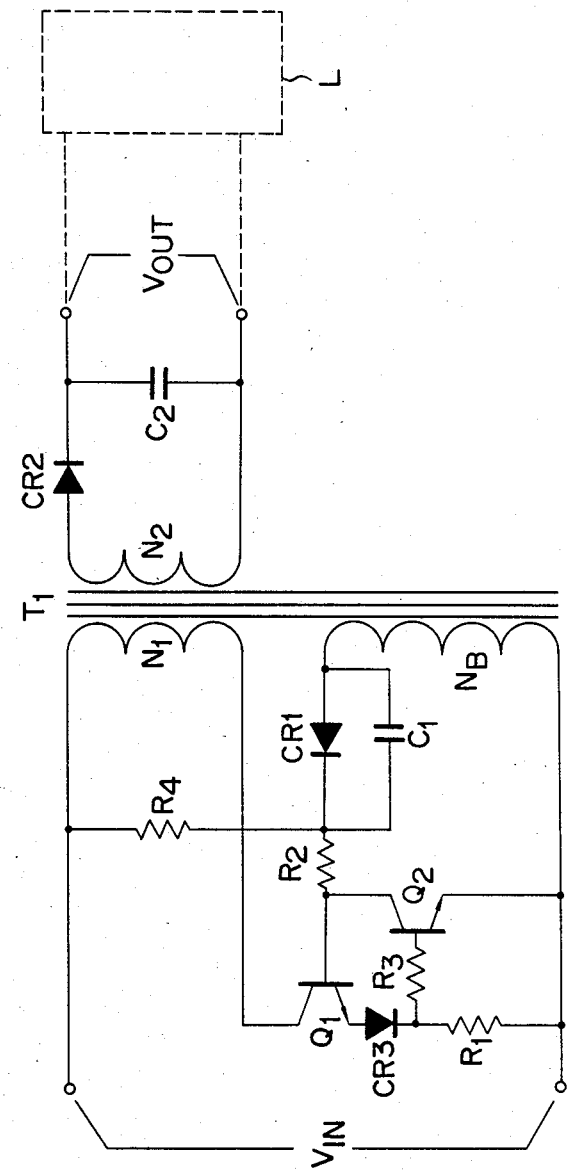
FIG. 1 is diagram of a conventional switching regulator of the self-excited ringing choke converter type.
Figure 3A:
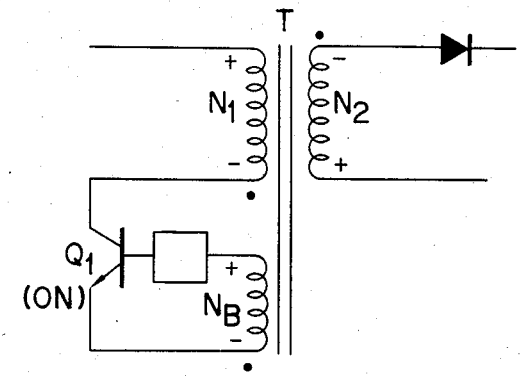
FIGS. 3B are respectively representations for explaining the voltage polarities of the respective windings of a tranformer T1 of the conventional circuit shown in FIG. 1.
Figure 3B:
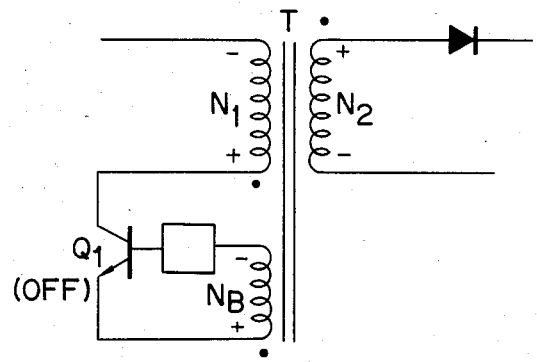

In the conventional arrangement shown in FIG. 1, an opposite flow of the base current of the transistor Q1 (removal of carriers charged by the base of the transistor Q1) is performed by the transistor Q2. In this arrangement, when the transistor Q2 is turned on, a current flows in the opposite direction in an order of Q1 (base), Q2, R1 and Q1 (emitter). This causes the unstable ON state of the transistor Q2.

However, according to the embodiment of the present invention, the transistor Q3 causes the opposite flow of the base current of the transistor Q1. For this reason, the carriers charged on the base of the transistor Q1 can be removed through a loop which excludes the resistor R1. The ON state of the transistor Q3 then becomes stable. As a result, the storage time of the transistor Q1 can be properly limited, the power loss can be decreased, and hence the output voltage control can be stabilized.

It should be noted that a control circuit may be connected to the base of the transistor Q2 to feed back the output voltage VOUT, as previously described with reference to the prior art.

What is claimed is:

1. A switching control circuit for use in a switching regulator of self-excited ringing choke converter type, having a voltage transformer with at least primary, secondary and base windings, and operated such that an astable power supply voltage applied to said primary winding is transferred to said secondary winding in a self-excited manner so as to rectify a voltage appearing at said secondary winding, hence a direct current voltage is generated, and the output voltage is stabilized by controlling switching of the first winding due to deviation of the output voltage, said switching control circuit comprising:

a switching power transistor which is arranged to be turned on and off in accordance with a base current derived from a voltage induced in the base winding, and which is adapted to introduce into a collector current, a current flowing through the primary winding of said voltage transformer, and to switch the collector current;

a resistor which is serially connected to said switching power transistor, and through which the collector current and the base current flow;

a feed back circuit for feeding back a control voltage, proportional to the output voltage generated in the secondary of said transformer, to the primary of said transformer;

a switching control transistor which is controlled to be turned on and off due to a voltage across said resistor, and the control voltage, and which absorbs, as a collector current thereof, a base current of said switching power transistor to turn off said switching power transistor; and a compensation transistor which is rendered conductive by the collector current of said switching control transistor, and which supplies the base current to said resistor in the same direction as the current which has been flowing into said resistor, so as to restrain the deviation of voltage across said resistor thereby stabilizing the on state of said switching control transistor.

* * * * *